US010194062B2

(12) United States Patent
Kim et al.

(10) Patent No.: US 10,194,062 B2
(45) Date of Patent: Jan. 29, 2019

(54) CAMERA MODULE, METHOD FOR ALIGNING OPTICAL AXIS OF CAMERA MODULE AND PORTABLE ELECTRONIC DEVICE INCLUDING CAMERA MODULE

(71) Applicant: SAMSUNG ELECTRO-MECHANICS CO., LTD., Suwon-Si (KR)

(72) Inventors: Sung Hoon Kim, Suwon-Si (KR); Po Chul Kim, Suwon-Si (KR); Jung Seok Lee, Suwon-Si (KR); Jae Ho Baik, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/502,547

(22) Filed: Sep. 30, 2014

(65) Prior Publication Data
US 2015/0103240 A1    Apr. 16, 2015

(30) Foreign Application Priority Data

Oct. 16, 2013  (KR) .................. 10-2013-0123246
Jan. 23, 2014  (KR) .................. 10-2014-0008263
Mar. 11, 2014  (KR) .................. 10-2014-0028631

(51) Int. Cl.
*G02B 7/08*    (2006.01)
*G03B 17/02*   (2006.01)
*H04N 5/225*   (2006.01)

(52) U.S. Cl.
CPC ............ *H04N 5/2254* (2013.01); *G02B 7/08* (2013.01); *G03B 17/02* (2013.01); *H04N 5/2252* (2013.01); *H04N 5/2257* (2013.01)

(58) Field of Classification Search
CPC .. H04N 5/2254; H04N 5/2252; H04N 5/2257; G02B 7/08; G03B 17/02
USPC ........................................................ 348/374
See application file for complete search history.

(56) References Cited

U.S. PATENT DOCUMENTS

2002/0141079 A1   10/2002 Onda
2007/0116452 A1   5/2007  Aoki et al.
2007/0165131 A1*  7/2007  Ish-Shalom .......... G02B 13/001
                                            348/345
2007/0236808 A1*  10/2007 Morita ................... G02B 7/021
                                            359/700

(Continued)

FOREIGN PATENT DOCUMENTS

CN    102081212 A    6/2011
CN    102375287 A    3/2012

(Continued)

OTHER PUBLICATIONS

Partial European Search Report dated Mar. 5, 2015 for European Patent Application No. 14275207.0.

(Continued)

*Primary Examiner* — Gevell V Selby
(74) *Attorney, Agent, or Firm* — NSIP Law

(57) ABSTRACT

A camera module may include a lens barrel supporting a lens, a frame in which the lens barrel is provided, and a housing accommodating the frame. The frame may be pressed toward one surface of the housing to thereby be relatively aligned in the housing so that an optical axis of the lens is positioned perpendicularly with respect to an image formation surface of an image sensor.

42 Claims, 12 Drawing Sheets

(56) References Cited

U.S. PATENT DOCUMENTS

| | | | |
|---|---|---|---|
| 2008/0174692 | A1 | 7/2008 | Kusaki et al. |
| 2008/0225452 | A1* | 9/2008 | Stoupis .............. H02J 13/0013 361/62 |
| 2008/0253003 | A1 | 10/2008 | Shin |
| 2009/0010638 | A1* | 1/2009 | Chao ........................ G02B 7/02 396/448 |
| 2011/0122517 | A1 | 5/2011 | Ko et al. |
| 2011/0158625 | A1 | 6/2011 | Chiang |
| 2011/0205424 | A1 | 8/2011 | Nakashima et al. |
| 2011/0217034 | A1* | 9/2011 | You ....................... H04N 5/2254 396/529 |
| 2011/0235198 | A1 | 9/2011 | Furuya et al. |
| 2012/0039590 | A1* | 2/2012 | Jacobsen .............. H04N 5/2254 396/133 |
| 2012/0082442 | A1* | 4/2012 | Kwon .................. G02B 27/646 396/55 |
| 2012/0092551 | A1 | 4/2012 | Ohishi et al. |
| 2012/0236422 | A1 | 9/2012 | Sue et al. |
| 2012/0300111 | A1* | 11/2012 | Ke ........................ H04N 5/2257 348/335 |
| 2013/0170055 | A1 | 7/2013 | Yu |
| 2013/0242183 | A1* | 9/2013 | Lee ....................... H04N 5/2257 348/374 |

FOREIGN PATENT DOCUMENTS

| | | |
|---|---|---|
| EP | 2 600 608 A2 | 6/2013 |
| EP | 1 471 731 A2 | 10/2014 |
| JP | 2005-165058 A | 6/2005 |
| JP | 2013-76944 A | 4/2013 |
| KR | 10-0849580 B1 | 7/2008 |
| KR | 10-2010-0082242 A | 7/2010 |
| KR | 10-0984338 B1 | 9/2010 |
| KR | 10-2011-0056519 A | 5/2011 |
| KR | 10-2011-0086936 | 8/2011 |
| KR | 10-2012-0010421 A | 2/2012 |
| KR | 10-2012-0106559 A | 9/2012 |
| KR | 10-2013-0015666 A | 2/2013 |
| KR | 10-1246178 B1 | 3/2013 |
| TW | 201001044 A | 1/2010 |
| TW | 201116880 A1 | 5/2011 |
| TW | 201326947 A1 | 7/2013 |
| WO | 2011/108430 | 9/2011 |

OTHER PUBLICATIONS

European Search Report dated Jul. 2, 2015 in counterpart Eurpoean Application No. 14275207.0 (18 pages in English).
Taiwanese Office Action dated Sep. 14, 2015 in counterpart Taiwanese Application No. TW 103134139 (17 pages, in Taiwanese, with English language translation).
Korean Office Action dated Nov. 1, 2015 in counterpart Korean Application No. 10-2014-0028631. (14 pages in Korean with English translation).
Korean Office Action dated Dec. 12, 2016 in counterpart Korean Patent Application No. 10-2016-0121399 (14 pages, with English translation).
Chinese Office Action dated Sep. 29, 2016 in counterpart Chinese Patent Application No. 201410548799.8 (44 pages, with English translation).
Chinese Office Action dated Mar. 29, 2018 in counterpart Chinese Patent Application No. 201410548799.8 (10 pages, in Chinese with English translation).

* cited by examiner

CAMERA MODULE, METHOD FOR ALIGNING OPTICAL AXIS OF CAMERA MODULE AND PORTABLE ELECTRONIC DEVICE INCLUDING CAMERA MODULE

CROSS-REFERENCE TO RELATED APPLICATIONS

This application claims the benefit of Korean Patent Application Nos. 10-2013-0123246 filed on Oct. 16, 2013, 10-2014-0008263 filed on Jan. 23, 2014, and 10-2014-0028631 filed on Mar. 11, 2014, with the Korean Intellectual Property Office, the disclosures of which are incorporated in their entireties herein by reference.

BACKGROUND

Embodiments of the present disclosure generally relates to a camera module, a method for aligning an optical axis of the camera module, and a portable electronic device including the camera module.

A camera module provided in a portable electronic device drives a lens barrel supporting one or more lenses in an optical axis for focusing purposes.

In this case, the lens barrel may move in an optical axis direction, and the optical axis of the lens may be disposed perpendicularly to an image formation surface of an image sensor.

However, the optical axis of the lens maybe inclined with respect to the image formation surface of the image sensor during a driving process of the lens barrel, and the optical axis of the lens may not be correctly aligned perpendicularly to the image formation surface of the image sensor in an initial assembly state.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

An exemplary embodiment in the present disclosure may provide a camera module capable of being adjusted, so that a tilted state of an optical axis of a lens with respect to an image formation surface of an image sensor is within a preset range, and a portable electronic device including the same.

An exemplary embodiment in the present disclosure may also provide a method for aligning an optical axis of a cameral module capable of correcting a tilted state of an optical axis of a lens.

According to an exemplary embodiment in the present disclosure, a camera module may include a lens barrel supporting one or more lenses, a frame in which the lens barrel is provided, and a housing accommodating the frame. The frame may be pressed toward one surface of the housing to thereby be relatively aligned in the housing so that an optical axis of the lens is positioned perpendicularly to an image formation surface of an image sensor.

The camera module may further include an elastic member movably pressing the frame.

The frame may be pressed toward one surface of the housing by pressing force of the elastic member, such that the frame may be closely adhered to the housing.

An opening exposing a portion of the frame to the outside of the housing may be provided in the housing so that a position of the frame may be adjusted.

An adjustment part may be provided in the portion of the frame exposed through the opening.

The position of the frame may be adjusted by inserting a separate tool into the adjustment part to move or lift the frame.

In a method for aligning an optical axis of a camera module according to an exemplary embodiment in the present disclosure, after assembling the camera module, a tilted state of an optical axis of a lens may be measured, and it may be determined whether or not a position of the frame needs to be adjusted, depending on whether or not the tilted state of the optical axis is within a preset range.

In the method for aligning an optical axis of a camera module according to an exemplary embodiment in the present disclosure, adjustment of the position of the frame may be optional.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments maybe incorporated into any of the above-described aspects alone or in any combination. Again, the brief summary presented above is intended only to familiarize the reader with certain aspects and contexts of embodiments of the present disclosure without limitation to the claimed subject matter.

BRIEF DESCRIPTION OF DRAWINGS

The above and other aspects, features and advantages in the present disclosure will be more clearly understood from the following detailed description taken in conjunction with the accompanying drawings, in which.

DETAILED DESCRIPTION OF EMBODIMENTS

Figure 1:
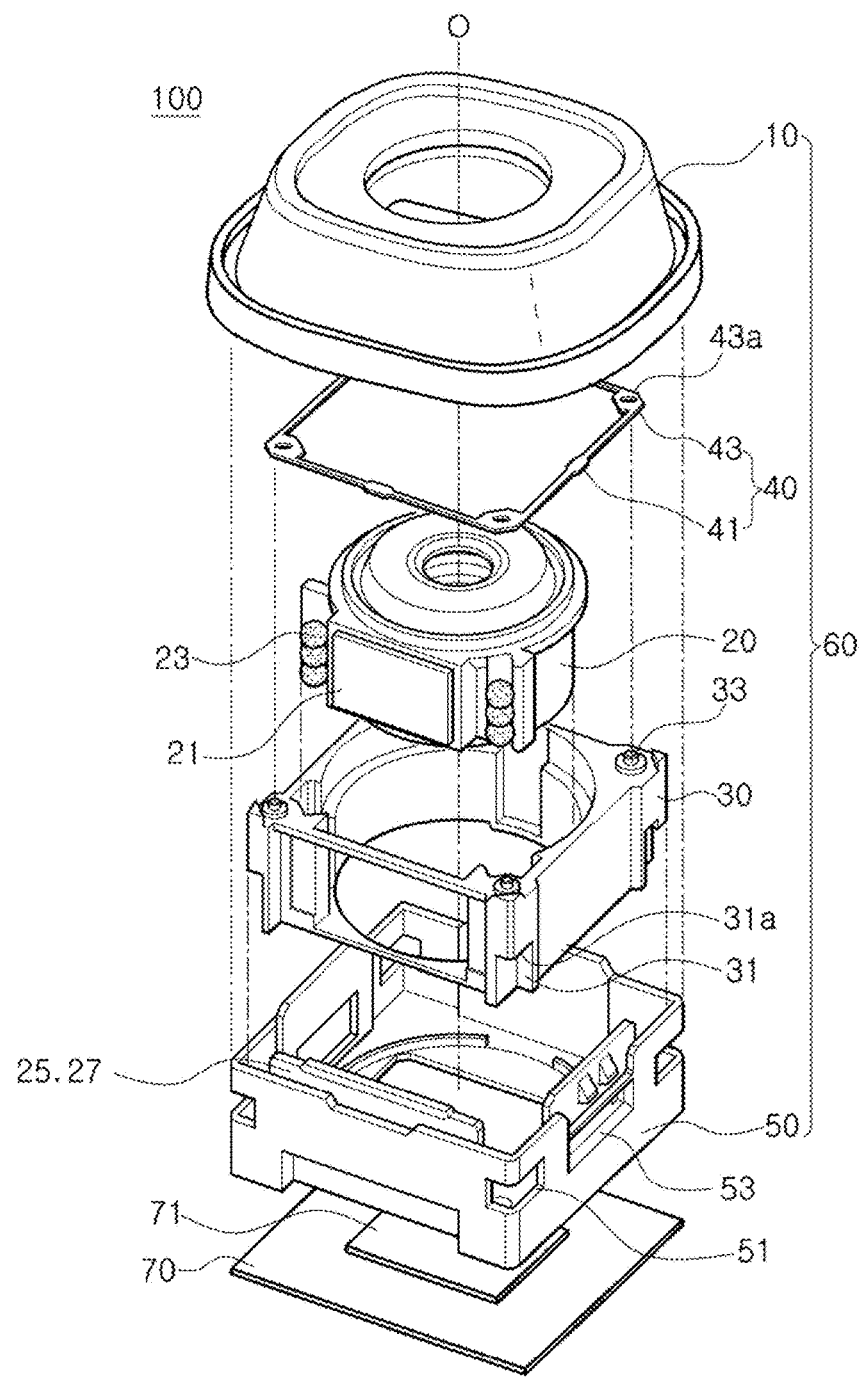
FIG. 1 is an exploded perspective view of a camera module according to an exemplary embodiment in the present disclosure.

Hereinafter, exemplary embodiments in the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

FIG. 1 is an exploded perspective view of a camera module according to an exemplary embodiment in the present disclosure.

Referring to FIG. 1, a camera module 100 according to an exemplary embodiment in the present disclosure may include a lens barrel 20, a frame 30, and a housing 60.

First, terms with respect to directions will be defined for illustration purposes only. An optical axis direction refers to a vertical direction based on the lens barrel 20, and a length or width direction refers to a direction from one corner of the frame 30 toward the other corner thereof.

The lens barrel 20 may have a hollow cylindrical shape so that at least one or more lenses for imaging an object may be accommodated therein, and the lens may be provided in the lens barrel 20 on an optical axis.

The lens barrel 20 may be coupled to the frame 30. For example, the lens barrel 20 may be disposed in the frame 30.

Here, the lens barrel 20 may move within the frame 30 in the optical axis direction for auto-focusing.

In order to move the lens barrel 20 in the optical axis direction, a magnet 21 may be mounted on one surface of the lens barrel 20 as a driving part, and a coil 25 may be disposed to face the magnet 21 within the housing 60.

The coil 25 may move the lens barrel 20 in the optical axis direction through electromagnetic interaction with the magnet 21 disposed adjacently thereto.

In addition, a yoke 27 may be attached to the coil 25 to prevent leakage of magnetic flux.

The magnet 21 may form a predetermined magnetic field. When power is applied to the coil 25, driving force may be generated through the electromagnetic interaction between the magnet 21 and the coil 25 to move the lens barrel 20 in the optical axis direction thereby.

The frame 30 may accommodate the lens barrel 20 therein to support the lens barrel 20.

Therefore, an internal space may be formed in the frame 30 so as to accommodate the lens barrel 20.

Meanwhile, one or a plurality of ball bearings 23 may be provided in the lens barrel 20 in the optical axis direction as a guide means for facilitating the movement of the lens barrel 20 when the lens barrel 20 moves in the frame 30 in the optical axis direction.

The plurality of ball bearings 23 may contact an outer surface of the lens barrel 20 and an inner surface of the frame 30 to guide the movement of the lens barrel 20 in the optical axis direction.

For example, the plurality of ball bearings 23 may be disposed between the lens barrel 20 and the frame 30 and support the movement of the lens barrel 20 in the optical axis direction through a rolling motion.

Therefore, when the lens barrel 20 moves in the optical axis direction, the plurality of ball bearings 23 may support the lens barrel 20, so that the lens barrel 20 may move in parallel to the optical axis.

The housing 60 may include first and second cases 10 and 50 coupled to each other to provide an internal space, and the frame 30 may be disposed in the internal space.

For example, the second case 50 may accommodate the frame 30 so that an upper portion of the frame 30 is exposed through the second case 50, and the first case 10 may be coupled to the second case 50 to enclose the upper portion of the frame 30.

A printed circuit board 70, on which an image sensor 71 may be mounted, may be fixed to a lower portion of the housing 60.

Meanwhile, the frame 30 may be disposed in the internal space of the housing 60 to thereby be pressed toward one surface of the housing 60.

The camera module 100 according to the exemplary embodiment in the present disclosure may further include an elastic member 40 pressing the frame 30.

The frame 30 may be pressed by the elastic member 40 to thereby be relatively aligned with respect to the housing 60.

When the frame is accommodated in the internal space of the housing, the frame maybe inclined with respect to the housing due to assembly tolerance, or the like, therebetween. As a result, the optical axis of the lens provided in the lens barrel accommodated in the frame may be tilted.

However, in the camera module 100 according to the exemplary embodiment in the present disclosure, the frame 30 may be relatively aligned with respect to the housing 60 in a state in which the frame 30 is elastically supported by the elastic member 40. Accordingly, an assembly defect due to assembly tolerance therebetween may be decreased.

Figure 2A:
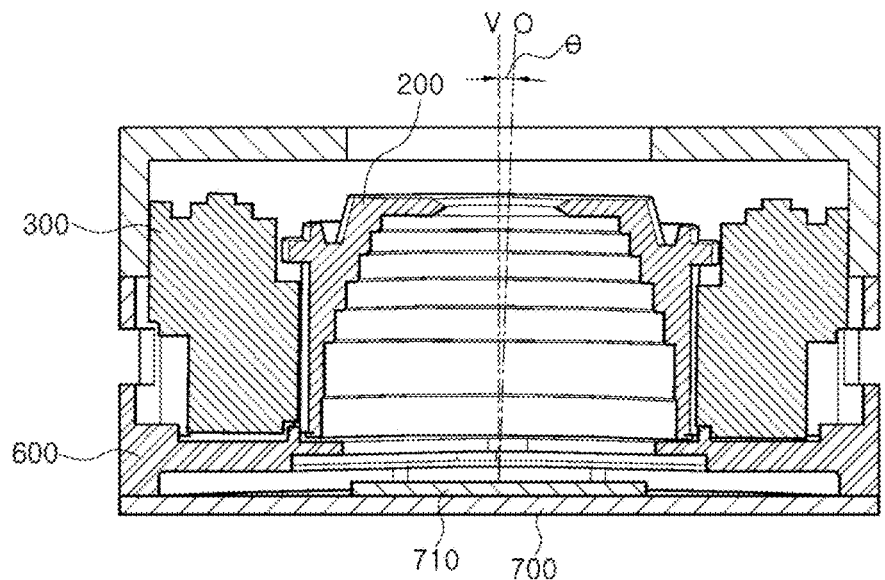
FIG. 2A is a schematic cross-sectional view illustrating the case in which an optical axis of a lens is disposed in a camera module in a tilted state.
Figure 2B:
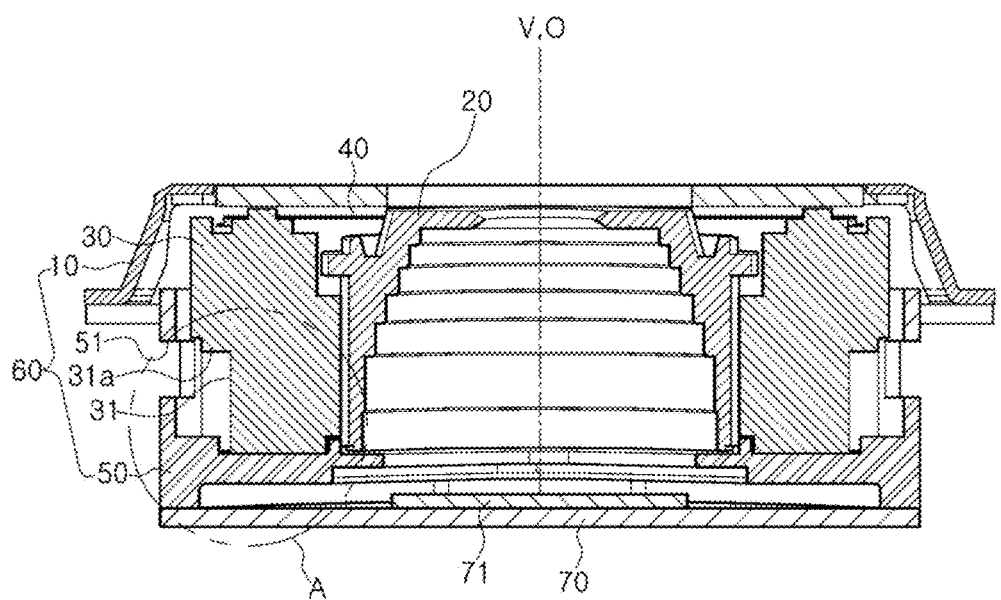
FIG. 2B is a cross-sectional view of the camera module according to an exemplary embodiment in the present disclosure.
Figure 2C:
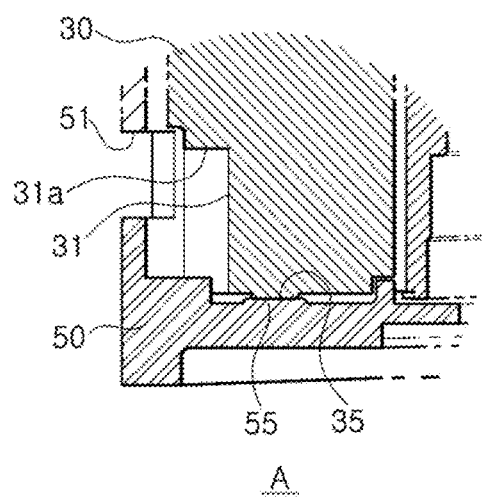
FIG. 2C illustrates a partial view of a modified example of part A of FIG. 2B.

FIG. 2A is a schematic cross-sectional view illustrating the case in which an optical axis of a lens is disposed in a camera module in a tilted state, FIG. 2B is a cross-sectional view of the camera module according to an exemplary embodiment in the present disclosure, and FIG. 2C illustrates a partial view of a modified example of part A of FIG. 2B.

The case in which the optical axis O of the lens is tilted in the camera module will be described with reference to FIG. 2A.

In the case in which a frame 300 is accommodated in a housing 600 of the camera module, the frame 300 may not be disposed in parallel to the housing 600 but may be disposed in an inclined state due to various factors such as manufacturing tolerances or assembly tolerances of respective members, and the like.

Since the frame 300 accommodates a lens barrel 200, when the frame 300 is disposed in the inclined state, the lens barrel 200 may be also inclined, and as a result, the optical axis O of the lens provided in the lens barrel 200 may be inclined.

For example, the optical axis O of the lens is not disposed perpendicularly with respect to an image formation surface of an image sensor 710 disposed in a lower portion of the housing 600 but is inclined at an angle (θ) with respect to a virtual line V, perpendicular with respect to the image formation surface of the image sensor 710.

In the case in which the optical axis O of the lens is tilted as described above, an image captured by the camera module maybe distorted, and the distortion may have a negative influence on resolution leading to deteriorations of image quality, and the like.

Referring to FIG. 2B, in the camera module 100 according to an exemplary embodiment in the present disclosure, the frame 30 may be pressed toward one surface of the housing 60.

To this end, for example, but not limited to, the camera module 100 according to the exemplary embodiment in the present disclosure may include the elastic member 40. The elastic member 40 may be disposed to press the frame 30 inside the housing 60.

Since the frame 30 is pressed in a pressing direction of the elastic member 40 (that is, a direction toward one surface of the housing 60), one surface of the frame 30 may be closely adhered to one surface of the housing 60.

That is, the frame 30 may be aligned in the housing 60 and closely adhered to the housing 60 by the pressing or elastic force of the elastic member 40.

In addition, the frame 30 may be fixed in the housing 60 in a state in which the frame 30 is aligned so that the optical axis O of the lens is positioned perpendicularly with respect to the image formation surface of the image sensor 71.

Here, the term "perpendicular" may be used in the sense including the case in which an angle between the virtual line V orthogonal to the image formation surface of the image sensor 71 and the optical axis O of the lens is within a preset range, as well as the case in which the angle between the image formation surface of the image sensor 71 and the optical axis O of the lens is around 90 degrees.

Therefore, a problem in which the frame 30 is disposed in an inclined state with respect to the housing 60 due to various factors such as assembly tolerance, and the like, may be prevented, and as a result, perpendicularity of the optical axis O of the lens with respect to the image formation surface of the image sensor 71 may be secured by preventing the optical axis O of the lens from being tilted.

A modified example of a close adhesion state of the frame 30 and the housing 60 will be described with reference to FIG. 2C.

In the present exemplary embodiment, a protrusion part 35 may be formed on one surface of the frame 30, for example, a bottom surface of the frame 30, and a support part 55 may protrude from one surface of the housing 60 such as an inner surface of the housing 60 facing the bottom surface of the frame.

The frame 30 is pressed toward one surface of the housing 60, such that the protrusion part 35 and the support part 55 may be closely adhered to each other.

In the present exemplary embodiment, even in the case that the entirety of one surface of the frame 30 and the entirety of one surface of the housing 60 are not closely adhered to each other, the protrusion part 35 and the support part 55 may be closely adhered to each other, thereby obtaining the same effect as that of the camera module 100 according to the exemplary embodiment in the present disclosure.

Figure 3:
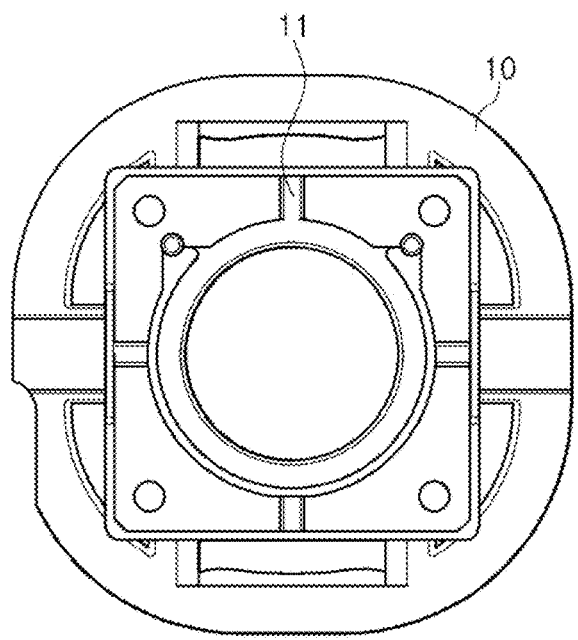
FIG. 3 is a bottom view of a first case according to an exemplary embodiment in the present disclosure.
Figure 4:
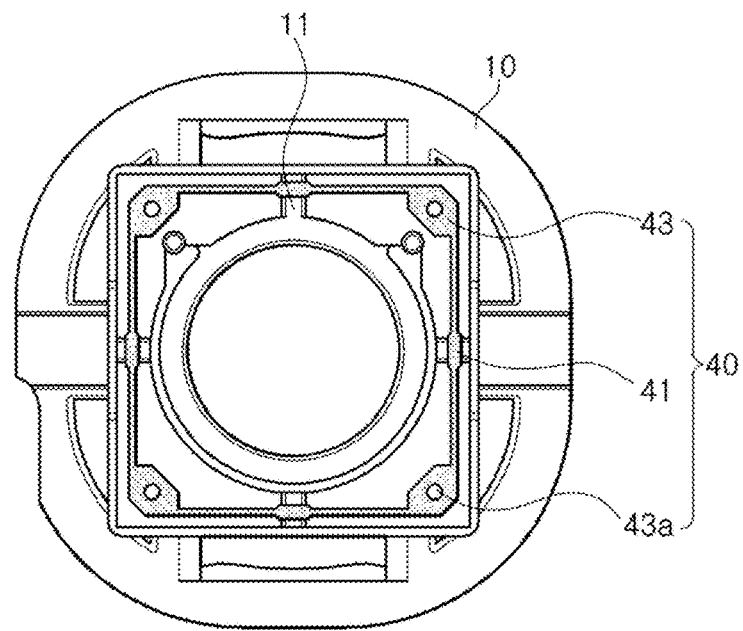
FIG. 4 is a bottom view illustrating a manner in which an elastic member is fixed to the first case, according to an exemplary embodiment in the present disclosure.

FIG. 3 is a bottom view of the first case according to an exemplary embodiment in the present disclosure, and FIG. 4 is a bottom view illustrating a manner in which the elastic member is fixed to the first case according to an exemplary embodiment in the present disclosure.

Figure 5A:
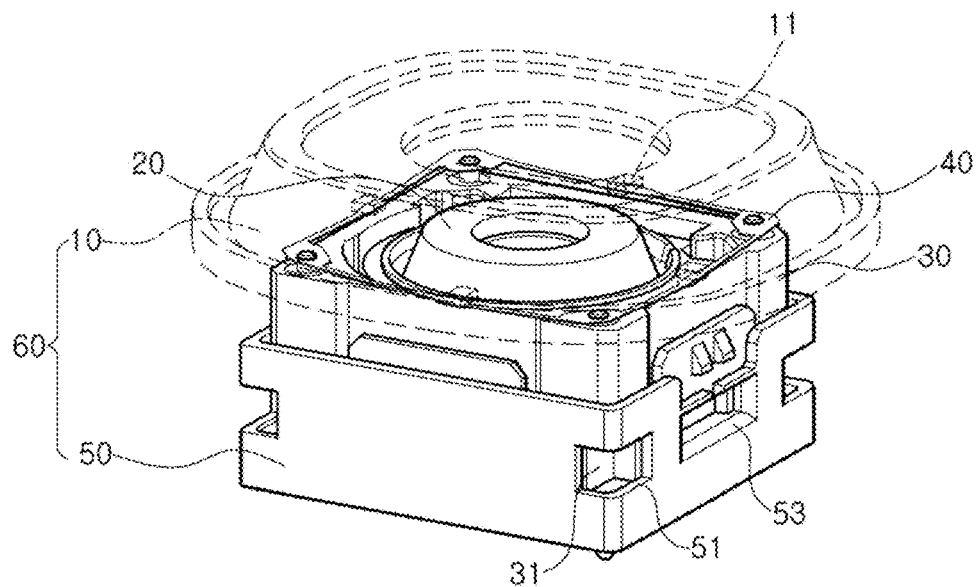
FIG. 5A is a schematic perspective view illustrating a manner in which the elastic member presses a frame, according to an exemplary embodiment in the present disclosure.
Figure 5B:
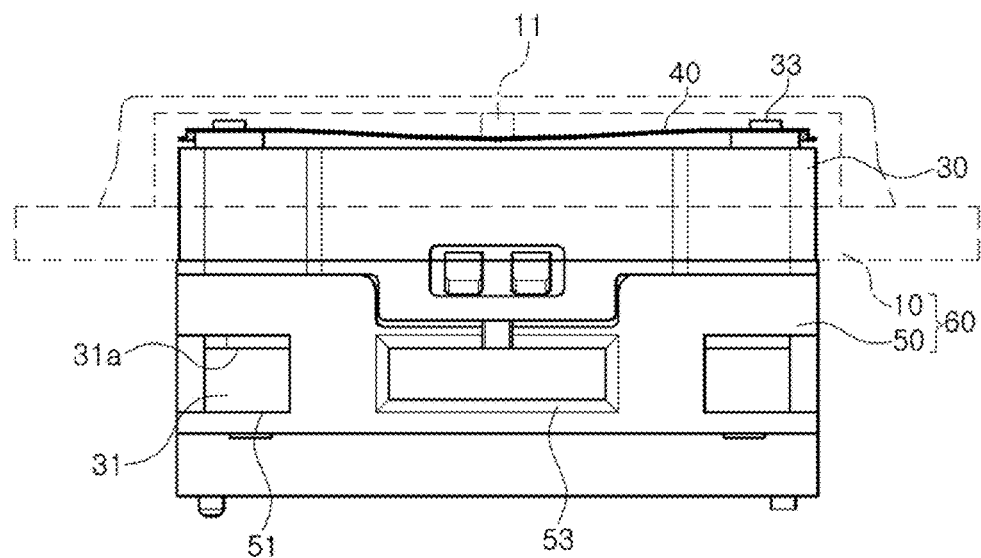
FIG. 5B is a schematic side view illustrating a manner in which the elastic member presses the frame, according to an exemplary embodiment in the present disclosure.

In addition, FIG. 5A is a schematic perspective view illustrating a manner in which the elastic member presses the frame according to an exemplary embodiment in the present disclosure, and FIG. 5B is a schematic side view illustrating a manner in which the elastic member presses the frame according to an exemplary embodiment in the present disclosure.

An exemplary structure allowing pressing force to be generated in the elastic member 40 will be described with reference to FIGS. 3 through 5B.

First, referring to FIGS. 5A and 5B, the elastic member 40 and the frame 30 may be assembled by connecting the elastic member 40 to the upper portion of the frame 30.

For example, a coupling groove or hole 43a may be formed in each corner of the elastic member 40, and a coupling protrusion 33 may be formed at each corner of the upper portion of the frame 30 corresponding to the coupling groove 43a. The coupling protrusions 33 may be inserted into the coupling grooves 43a, such that the elastic member 40 may be coupled to the frame 30.

Here, the coupling protrusion 33 protruding from each corner of the upper portion of the frame 30 may have a double structure, for example, but not limited to, a double-stepped shape.

Therefore, the elastic member 40 may be disposed to be space apart from the frame. For example, some portions of the elastic member 40 may be connected to the frame 30, and other portions of the elastic member 40 may be spaced apart from an upper surface of the frame 30.

Here, as shown in FIG. 3, one or more pressing protrusions 11 pressing the portions of the elastic member 40 (the portions thereof spaced apart from the upper surface of the frame 30) may be formed on a lower surface of the first case 10.

In the case of coupling the first and second cases 10 and 50 to each other, since the pressing protrusions 11 press the portions of the elastic member 40 spaced apart from the upper surface of the frame 30, pressing force may be generated in the elastic member 40 downwardly in the optical axis direction, thereby pressing the frame 30 toward one surface of the second case 50. In the state that the frame is pressed by the elastic member 40, the frame 30 is movable by predetermined or greater force.

Therefore, the frame 30 may be closely adhered to one of the first and second cases 10 and 50 by the pressing force of the elastic member 40. In the present exemplary embodiment, the frame 30 may be closely adhered to the second case 50.

Referring to FIG. 4, the elastic member 40 may be fixed to the pressing protrusions 11 provided in the first case 10.

The first case 10 may be coupled to the second case 50 in a state in which the elastic member 40 is fixed, and the elastic member 40 and the frame 30 may be connected to each other in the coupling process of the first and second cases 10 and 50.

The elastic member 40 may include a fixed end 41 connected to the pressing protrusion 11 of the first case 10 and a driving end 43 connected to the frame 30.

A lower surface of the pressing protrusion 11 of the first case 10 may be positioned downwardly of an upper surface of the coupling protrusion 33 of the frame 30 in the optical axis direction.

Therefore, when the first and second cases 10 and 50 are coupled to each other, one of the fixed end 41 and the driving end 43 may be positioned downwardly of the other in the optical axis direction.

That is, the fixed end 41 and the driving end 43 may be positioned on different planes from each other by the coupling of the first and second cases 10 and 50.

In the present exemplary embodiment, the fixed end 41 may be positioned downwardly of the driving end 43 in the optical axis direction, such that pressing force may be generated in the driving end 43 due to a difference in the positions or levels of the fixed end 41 and the driving end 43.

The frame 30 may be closely adhered to the second case 50 by the pressing force of the elastic member 40 pressing the frame 30, such that an assembly tolerance to be generated during an assembling process of the frame 30 and the second case 50 may be decreased.

Therefore, a problem in which the frame 30 may disposed in an inclined state with respect to the second case 50 may be prevented, and as a result, perpendicularity of the optical axis O of the lens with respect to the image formation surface of the image sensor 71 may be secured by preventing the optical axis O of the lens from being tilted.

Figure 6:
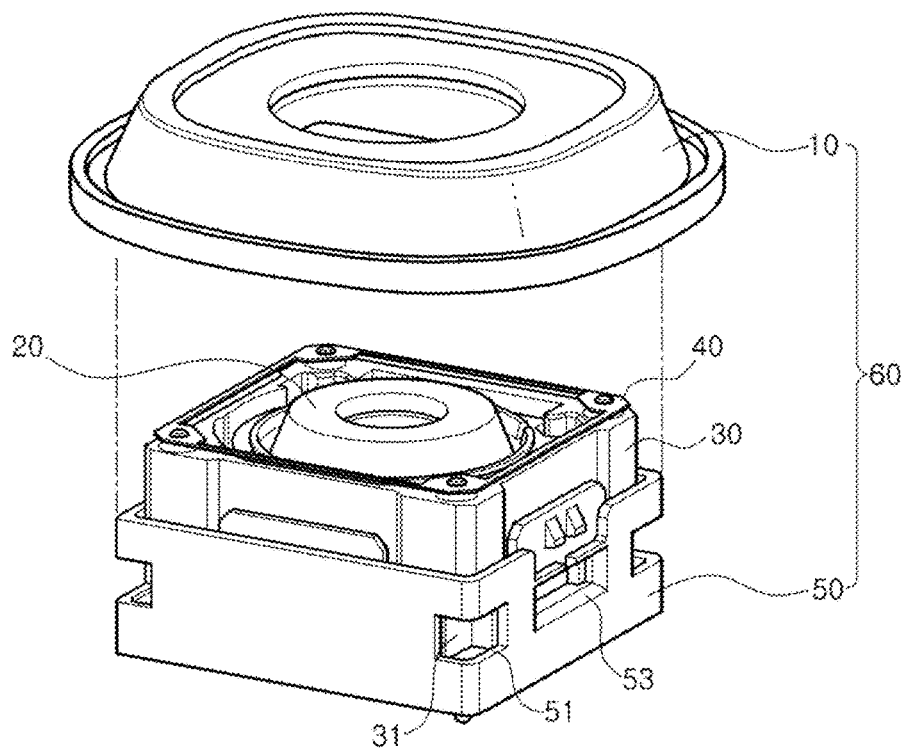
FIG. 6 is a partially exploded perspective view of the camera module according to an exemplary embodiment in the present disclosure.
Figure 7:
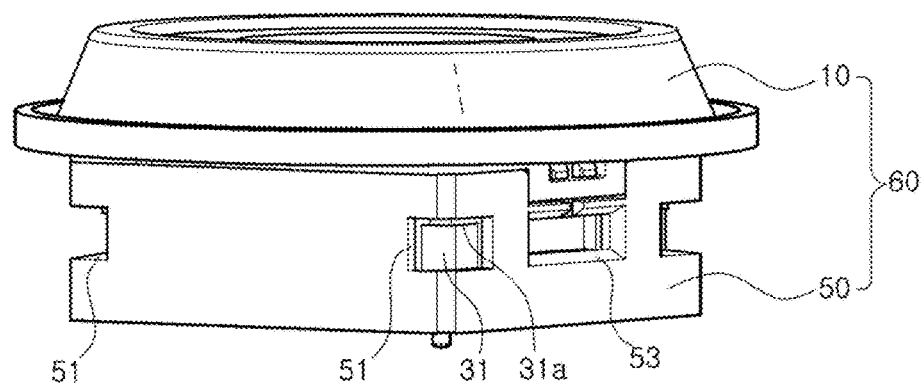
FIG. 7 is an assembled perspective view of the camera module according to an exemplary embodiment in the present disclosure.
Figure 8:
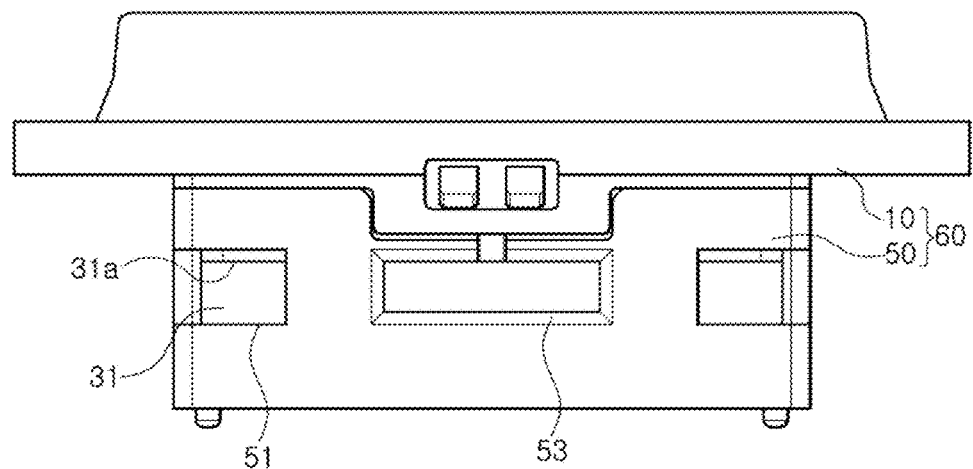
FIG. 8 is a side view of the camera module according to an exemplary embodiment in the present disclosure.

FIG. 6 is a partially exploded perspective view of the camera module according to an exemplary embodiment in the present disclosure, FIG. 7 is an assembled perspective view of the camera module according to an exemplary embodiment in the present disclosure, and FIG. 8 is a side view of the camera module according to an exemplary embodiment in the present disclosure.

Figure 9:
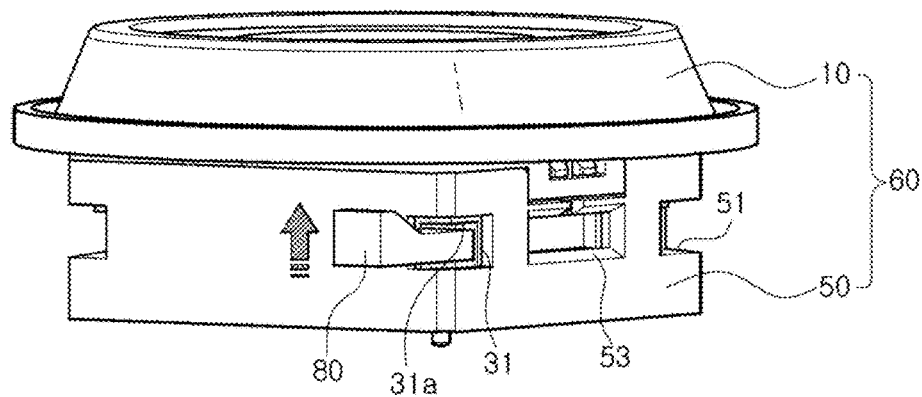
FIG. 9 is a perspective view illustrating a manner adjusting a position of the frame in the camera module according to an exemplary embodiment in the present disclosure.

FIG. 9 is a perspective view illustrating a manner adjusting a position of the frame in the camera module according to an exemplary embodiment in the present disclosure.

A structure for additionally or optionally aligning the optical axis O of the lens in the camera module 100 according to an exemplary embodiment in the present disclosure will be descried with reference to FIGS. 6 through 9.

The frame 30 may be aligned in the housing 60 in a state in which the frame 30 is elastically supported by the elastic member 40. Therefore, one surface of the frame 30 may be closely adhered to one surface of the housing 60.

However, even in the case that the frame 30 and the housing 60 are closely adhered to each other, the optical axis O of the lens may not be aligned perpendicularly with respect to the image formation surface of the image sensor 71 due to, for example, the manufacturing tolerance between the frame 30 and the housing 60, the assembly tolerance between the frame 30 and the lens barrel 20, or the like, and additional alignment may be required.

Therefore, one or more openings 51 exposing a portion of the frame 30 to the outside of the housing 60 may be provided in the housing 60 of the camera module 100 according to the exemplary embodiment in the present disclosure so that the position of the frame 30 maybe adjusted after the camera module 100 is assembled.

In the camera module 100 according to the exemplary embodiment in the present disclosure, the position of the frame 30 may be adjusted by moving the frame 30 exposed through the openings 51, such that the optical axis O of the lens may be additionally aligned even in a state in which the camera module is assembled.

In addition, the frame 30 may be aligned in the housing 60 in a state in which a gap may be formed between a side wall of the frame 30 and a side inner wall of the housing 60.

The gap may be formed between the side wall of the frame 30 and the side wall of the housing 60 so that the frame 30 may be moved in the housing 60 after the camera module 100 is assembled.

Here, the opening 51 may be provided in the side wall of the housing 60.

In the camera module 100 according to the exemplary embodiment in the present disclosure, one or more adjustment parts 31 may be provided in a portion of the frame 30 exposed through the opening 51 of the housing 60 so that the alignment state of the frame 30 maybe easily adjusted. For example, but not limited to, the adjustment part 31 may have a step shape or a grove.

The adjustment part 31 and the opening 51 may be formed in corners of the frame 30 and the housing 60.

The adjustment part 31 and the opening 51 may be formed in positions corresponding to each other, and the adjustment part 31 may be exposed outwardly through the opening 51.

Therefore, in the case in which the optical axis O of the lens needs to be additionally aligned in the camera module 100 according to the exemplary embodiment in the present disclosure, the alignment state of the frame 30 may be adjusted by inserting a separate tool 80 (for example, a tip or jig) into the adjustment part 31 exposed outwardly through the opening 51 to move the frame 30 as shown in FIG. 9.

For example, when the tool 80 (for example, the tip or jig) is inserted into the adjustment part 31 of the frame 30 through the opening 51 of the housing 60, the tool 80 (for example, the tip or jig) may contact the adjustment part 31. Further, the frame 30 may be moved by lifting the frame 30 using the tool 80 (for example, the tip or jig).

As described above, the frame 30 may be moved using the tool 80 (for example, the tip or jig), the optical axis O of the lens maybe aligned to be positioned perpendicularly with respect to the image formation surface of the image sensor 71 by adjusting the position of the frame 30.

As a result, the lens barrel 20 accommodated in the frame 30 may be moved by adjusting the alignment state of the frame 30, and the optical axis O of the lens provided in the lens barrel 20 may be aligned by moving the lens barrel 20.

That is, the optical axis O of the lens may be positioned perpendicularly with respect to the image formation surface of the image sensor 71 by adjusting the position of the frame 30.

The frame 30 may be fixed to the housing 60 in a state in which the frame 30 is aligned so that the optical axis O of the lens is positioned perpendicularly with respect to the image formation surface of the image sensor 71.

Meanwhile, as the frame 30 is lifted through the adjustment part 31, at least a portion of one surface of the frame 30 closely adhered to one surface of the housing 60 may be spaced apart from one surface of the housing 60 by a predetermined interval.

In other words, the frame 30 may be fixed to the housing 60 in a state in which the frame 30 is inclined with respect to the housing 60 so that the optical axis O of the lens is positioned perpendicularly with respect to the image formation surface of the image sensor 71.

Therefore, a larger force may be applied to a portion of the elastic member 40 pressing the frame 30 than other portions thereof, and the frame 30 may be supported by the elastic member 40 in a state in which the frame 30 is tilted with respected to the housing 60.

However, the present disclosure is not limited thereto, but even in the case of lifting the frame 30 through the adjustment part 31, the frame 30 may be in parallel to the housing 60. In this case, the frame 30 may be fixed in a state in which the frame 30 is parallel to the housing 60.

Meanwhile, at least one adhesion hole 53 may be formed in the housing 60. An outer surface of the frame 30 may be exposed to the outside of the housing 60 through the adhesion hole 53.

For example, an adhesive (not shown) may be injected or provided in at least one of the adhesion hole 53 and the opening 51 to thereby fix the position of the frame 30. However, any means or material for fixing the position of the frame 30 may be used.

Figure 10A:
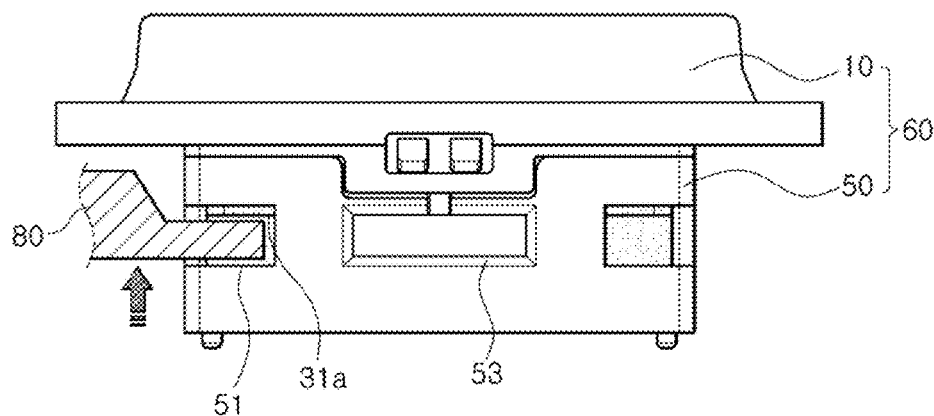
FIGS. 10A through 10C are side views illustrating modified examples of an upper surface of an adjustment part in the camera module according to exemplary embodiments in the present disclosure.
Figure 10B:
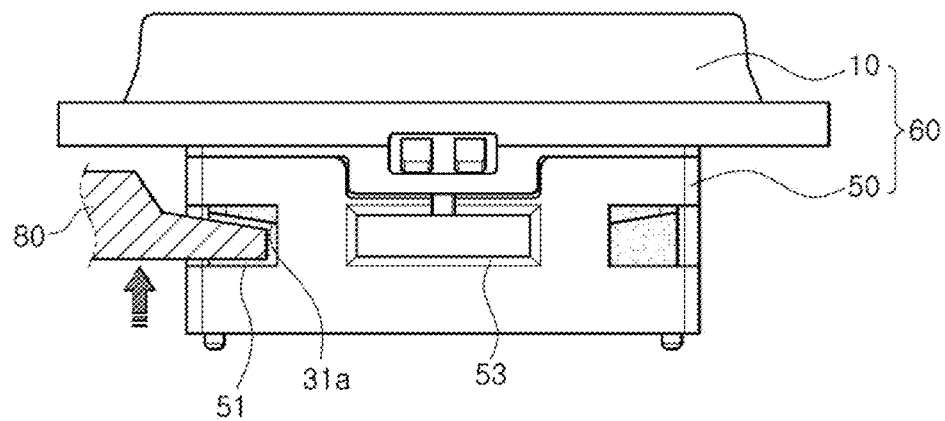
Figure 10C:
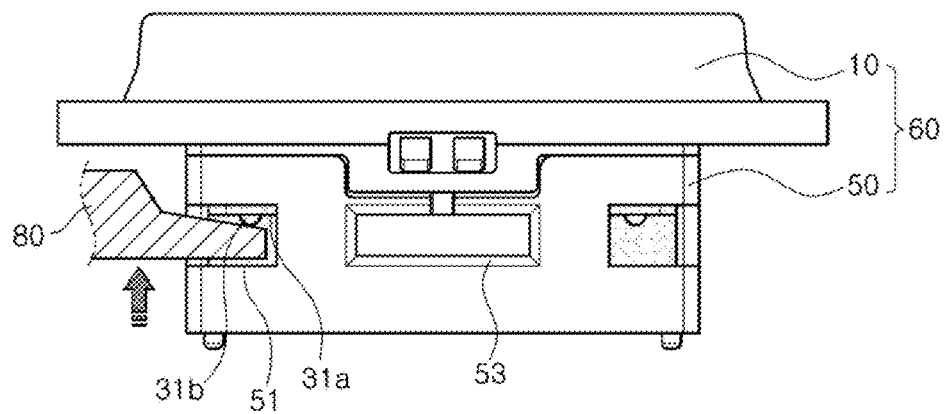

FIGS. 10A through 10C are side views illustrating modified examples of an upper surface of an adjustment part in the camera module according to exemplary embodiments in the present disclosure.

Referring to FIG. 10A, an upper surface 31a of the adjustment part 31 maybe a flat surface. In the present exemplary embodiment, the position of the frame 30 may be adjusted by inserting the tool 80 (for example, the tip or jig) to the adjustment part 31 to lift the frame 30.

Referring to FIG. 10B, an upper surface 31a of the adjustment part 31 may be inclined.

For example, the upper surface 31a of the adjustment part 31 may be inclined downwardly in a length or width direction of the frame 30.

In this case, one surface of the tool 80 (for example, the tip or jig) may be inclined so as to correspond to the upper surface 31a of the adjustment part 31. When the tool 80 (for example, the tip or jig) is inserted into the adjustment part 31 in a state in which one surface thereof contacts the upper surface 31a of the adjustment part 31a, the frame 30 maybe moved naturally. Therefore, the position of the frame 30 may be easily adjusted.

Further, referring to FIG. 10C, a protrusion part 31b may be formed on an upper surface 31a of the adjustment part 31.

In this case, one surface of the tool 80 (for example, the tip or jig) contacting the protrusion part 31b may be inclined downwardly toward a distal end. When the tool 80 (for example, the tip or jig) is inserted in a state in which one surface thereof contacts the protrusion part 31b, the frame 30 may be moved naturally. Therefore, the position of the frame 30 may be easily adjusted.

Here, an outer surface of the protrusion part 31b may be curved. Since the protrusion part 31b point-contacts the tool 80 (for example, the tip or jig), the frame 30 may be softly moved. However, the present disclosure is not limited thereto, but the protrusion part 31b may line-contact or surface-contact the tool (for example, the tip or jig).

In the case in which the condition for perpendicularity of the optical axis O of the lens is satisfied in a state in which one surface of the frame 30 and one surface of the housing 60 are closely adhered to each other, the close adhesion state of one surface of the frame 30 and one surface of the housing 60 may be maintained by, for example, but not limited to, the adhesive (not shown). Any means for fixing the position of the frame 30 may be used to maintain the close adhesion state of the frame 30 and the housing 60.

Further, in the case of adjusting the position of the frame 30 to align the optical axis O of the lens to be perpendicular with respect to the image formation surface of the image sensor 71 and then injecting the adhesive (not shown) into at least one of the adhesion hole 43 and the opening 51 to fix the frame 30 to the housing 60, at least a portion of one surface of the frame 30 may be spaced apart from one surface of the housing 60 by a predetermined interval.

Here, since the elastic member 40 presses the frame 30 downwardly in the optical axis direction, the adhesive (not shown) needs to have sufficient adhesive force to endure the pressing force of the elastic member 40 so that the lower surface of the frame 30 may be fixed to the housing 60 in a state in which the lower surface of the frame 30 is spaced apart from the housing 60 by a predetermined interval.

For example, adhesive force of the adhesive (not shown) may be the equal to or stronger than the pressing force of the elastic member 40 and may correspond to the pressing force of the elastic member 40 at least.

Figure 11A:
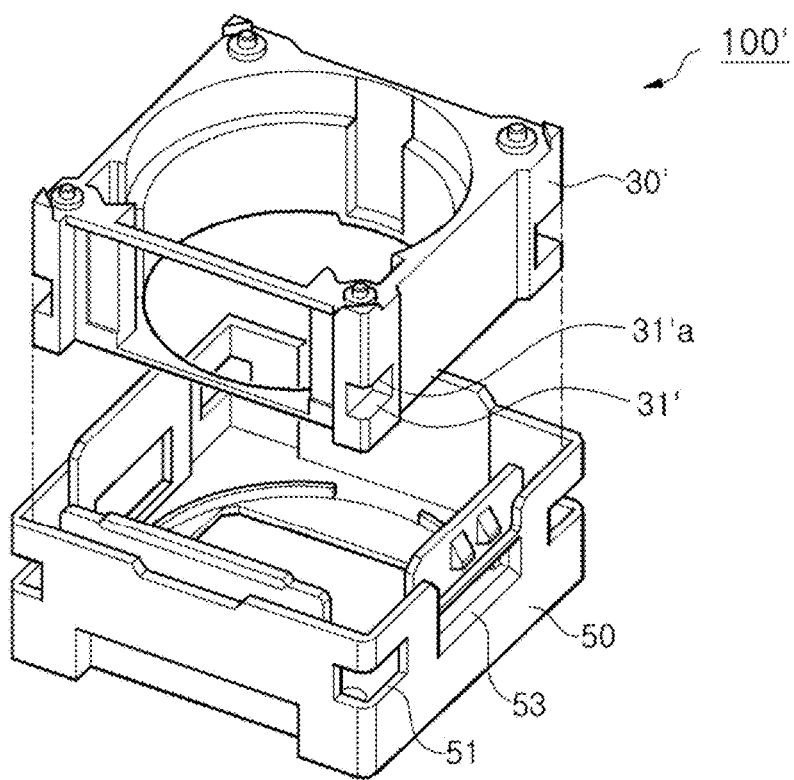
FIGS. 11A and 11B are perspective views illustrating modified examples of the adjustment part and an opening according to exemplary embodiments in the present disclosure.
Figure 11B:
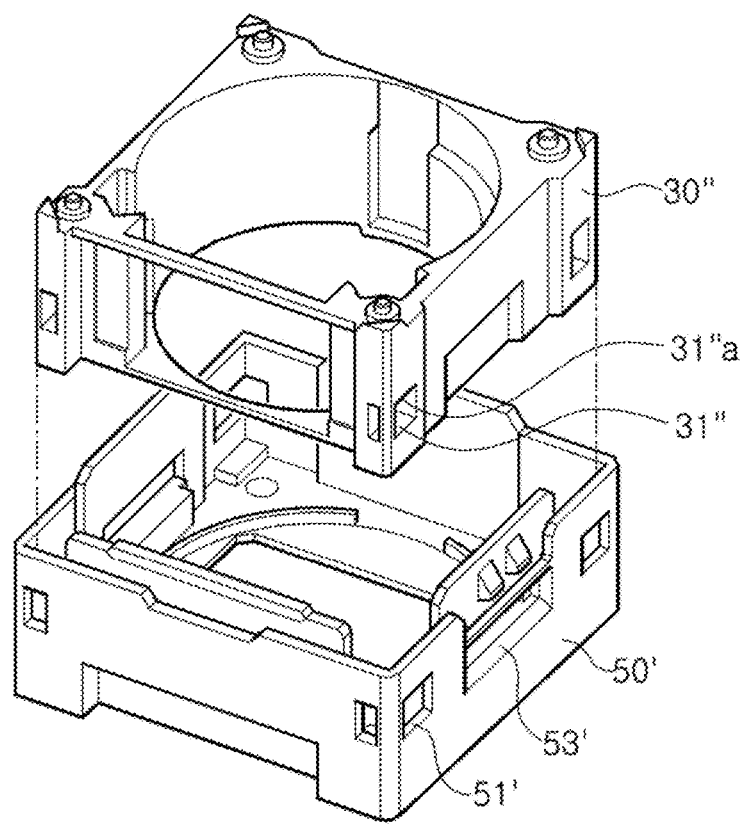

FIGS. 11A and 11B are perspective views illustrating modified examples of an adjustment part and an opening according to exemplary embodiments in the present disclosure.

Referring to FIG. 11A, in a camera module 100' according to another exemplary embodiment in the present disclosure, an adjustment part 31' may be provided in a corner of a frame 30' and have a groove shape. Referring to FIG. 11B, an adjustment part 31" and an opening 51' may be formed in side surfaces of a frame 30" and a second case 50', respectively.

In addition, the adjustment part 31" may be formed in the side surface of the frame 30" to be adjacent to the corner of the frame 30".

Therefore, similarly to the camera module 100 according to the above-described exemplary embodiment in the present disclosure, in the case of inserting the separate tool 80, or the like, into the opening 51', the tool 80 may contact an upper surface 31'a of the adjustment part 31". Further, the frame 30" may be moved by lifting the upper surface 31"a of the adjustment part 31" using the tool 80.

Figure 12:
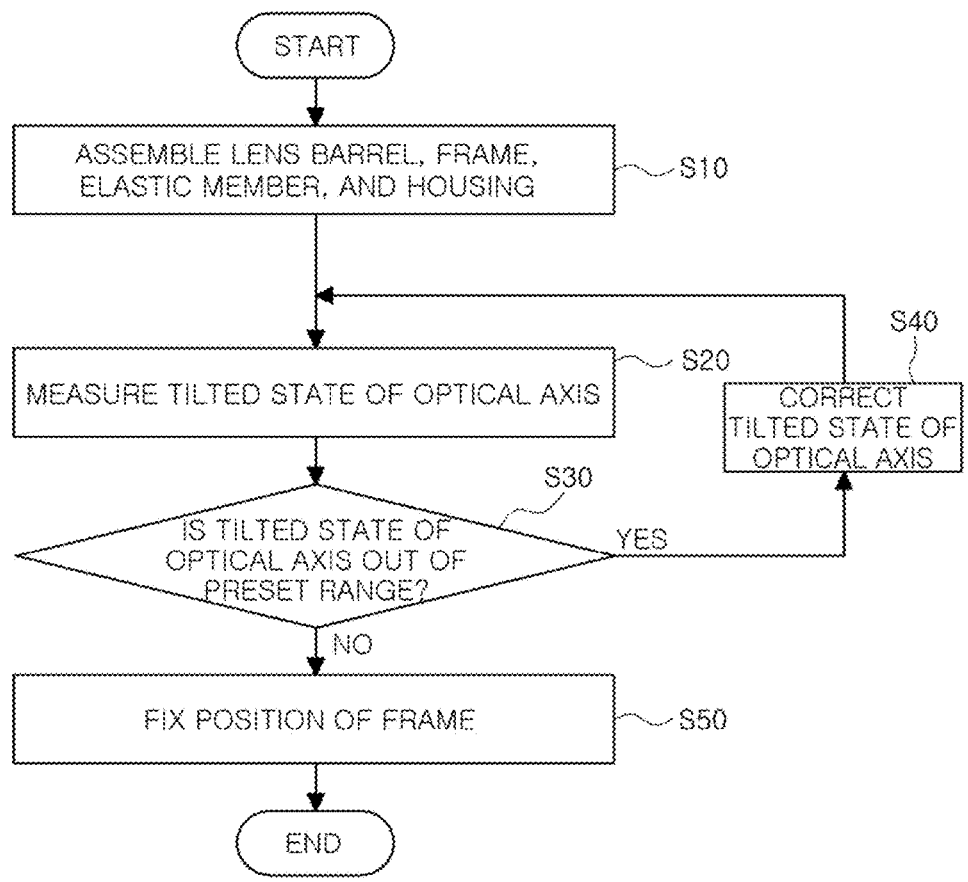
FIG. 12 is a flowchart schematically illustrating a method for aligning an optical axis of the camera module according to an exemplary embodiment in the present disclosure.

FIG. 12 is a flowchart schematically illustrating a method for aligning an optical axis of a camera module according to an exemplary embodiment in the present disclosure.

The method for aligning an optical axis of a camera module according to an exemplary embodiment in the present disclosure will be described with reference to FIG. 12.

First, in the step S10, the camera module 100 or 100' according to the exemplary embodiment in the present disclosure may be manufactured by assembling the lens barrel 20, the frame 30, and the housing 60.

Here, the lens barrel 20 may be accommodated in the frame 30, and the frame 30 may be accommodated in the housing 60.

The elastic member 40 may be provided in a process of manufacturing the camera module 100 or 100' so that the frame 30 may be pressed toward one surface of the housing 60 (S10).

The elastic member 40 may be fixed to the housing 60 and press the frame 30 to thereby allow one surface of the frame 30 to be closely adhered to one surface of the housing 60.

After the camera module 100 or 100' is assembled, a tilted state of the optical axis O of the lens accommodated in the lens barrel 20 may be measured (S20).

For example, it may be determined whether or not the optical axis O is perpendicular with respect to the image formation surface of the image sensor 71, and/or an angle between the virtual line V orthogonal to the image formation surface of the image sensor 71 and the optical axis O may be measured.

In addition, an angle between a virtual plane P parallel to the image formation surface of the image sensor 71 and one surface of the frame 30 may be measured.

By measuring the tilted state of the optical axis O of the lens, it may be determined whether or not the tilted state of the optical axis O is out of a preset range (S30).

In the case in which the measured tilted state of the optical axis O is within the preset range, the position of the frame 30 is fixed using for example, but not limited to, an adhesive, or the like (S50). Any means or material for fixing the position of the frame 30 may be used.

At this time, the frame 30 may be fixed to the housing 60 in a state in which one surface of the frame 30 and one surface of the housing 60 are closely adhered to each other.

However, in the case in which the tilted state of the optical axis O is out of the preset range, the tilted state of the optical axis O may be corrected (S40).

Correction of the tilted state of the optical axis O may mean that the tilted state of the optical axis O is corrected by moving at least one portion of the frame 30 so as to be within the preset range.

Here, when at least one portion of the frame 30 is lifted, the other portion of the frame 30 may be in a state of being fixed by the tool 80 (for example, the tip or jig) so as not to be moved.

A detailed description thereof will be described with reference to FIG. 13.

When the correction of the tilted state of the optical axis O is completed, the tilted state of the optical axis O may be measured again (S20), and it may be determined whether or not the tilted state of the optical axis O is out of the preset range (S30).

When the tilted state of the optical axis O is within the preset range, the position of the frame 30 maybe fixed (S50), and alignment of the optical axis of the camera module may be completed.

It is determined whether or not the tilted state of the optical axis O is out of the preset range (S30) in the present exemplary embodiment, but the present disclosure is not limited thereto. That is, the tilted state of the optical axis O may be corrected according to a tilting value of the optical axis O after measuring the tilted state of the optical axis O, and then the position the frame 30 may be fixed.

Figure 13:
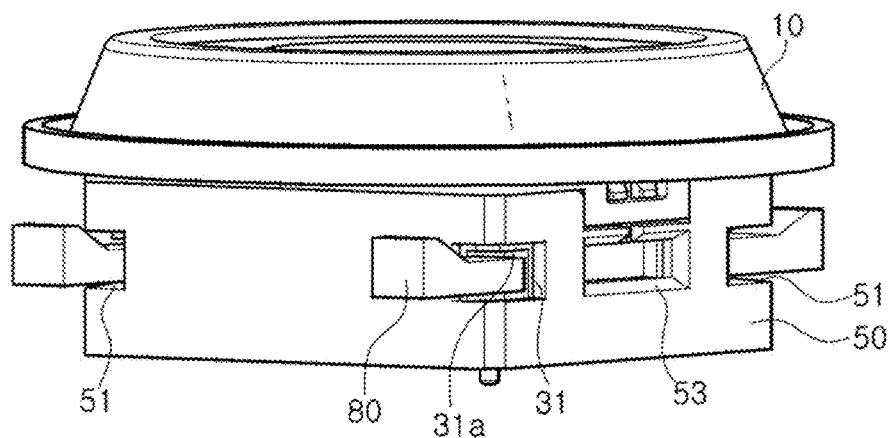
FIG. 13 is a conceptual view illustrating an example of the method for aligning an optical axis of a camera module according to an exemplary embodiment in the present disclosure.

FIG. 13 is a conceptual view illustrating an example of the method for aligning an optical axis of the camera module according to an exemplary embodiment in the present disclosure.

Referring to FIG. 13, after assembling the camera module 100 according to the exemplary embodiment in the present disclosure, in the case in which it is determined that correction of the tilted state of the optical axis O is required, the separate tools 80 (for example, the tip or jig) may be inserted into the adjustment parts 31.

In the present exemplary embodiment, the adjustment part 31 is formed in each corner of the camera module 100, such that four adjustment parts 31 may be provided.

Therefore, four tools 80 may be used, and each tool 80 may be inserted into the adjustment part 31.

The tools 80 inserted into the adjustment parts 31 may be independently moved, such that at least one portion of the frame 30 may be lifted by at least one tool 80 while the other portion of the frame 30 may be in a state of being fixed by the other tools 80.

For example, the frame 30 may be lifted using three tools 80, among four tools 80, and the frame 30 may be fixedly supported by the remaining tool 80, such that the tilted state of the optical axis O may be corrected.

Figure 14:
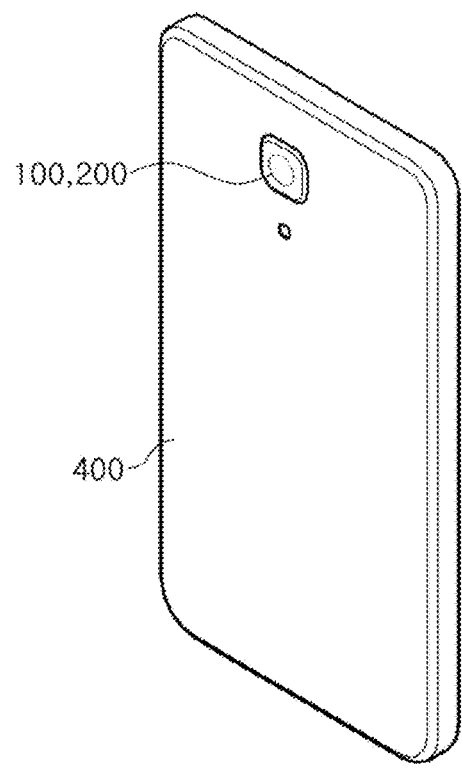
FIG. 14 is a perspective view of a portable electronic device including a camera module according to an exemplary embodiment in the present disclosure.

FIG. 14 is a perspective view of a portable electronic device including a camera module according to an exemplary embodiment in the present disclosure.

Referring to FIG. 14, a portable electronic device according to an exemplary embodiment in the present disclosure may include a body part 400 and a camera module 100 or 100'.

The camera module 100 or 100' may have all or some of the features of the camera module according to the above-described exemplary embodiments, and the camera module 100 or 100' may be coupled to the body part 400.

As set forth above, in the camera module, the method for aligning an optical axis of a camera module, and the portable electronic device including a camera module according to exemplary embodiments in the present disclosure, the position of an internal component may be selectively adjusted even after the assembling of the camera module.

Therefore, the tilted state of the optical axis of the lens with respect to the image formation surface of the image sensor may be adjusted so as to be included within the preset range.

While exemplary embodiments have been shown and described above, it will be apparent to those skilled in the art that modifications and variations could be made without departing from the scope of the invention as defined by the appended claims.

What is claimed is:

1. A camera module comprising:
 a frame accommodating a lens barrel configured to accommodate a lens having an optical axis, the lens barrel being movable in a direction of the optical axis;
 an elastic member connected to the frame; and
 a housing comprising a first case and a second case directly coupled to each other, and accommodating the frame in a fixed position in the direction of the optical axis,
 wherein the second case receives the frame and the frame is pressed towards one surface of the housing by the elastic member in a configuration in which the frame is relatively aligned with respect to the housing.

2. The camera module of claim 1, wherein one surface of the frame is closely adhered to the one surface of the housing.

3. The camera module of claim 1, wherein a protrusion part is provided on one surface of the frame and a support part is provided on the one surface of the housing, such that the protrusion part and the support part are closely adhered to each other.

4. The camera module of claim 1, wherein the optical axis of the lens accommodated in the lens barrel is disposed perpendicularly to an image formation surface of an image sensor disposed in the housing.

5. The camera module of claim 1, wherein the frame is fixed to the housing in a state in which the frame is aligned in the housing so that an angle between a line orthogonal to an image formation surface of an image sensor disposed in the housing and the optical axis of the lens accommodated in the lens barrel is within a preset range.

6. The camera module of claim 1, wherein the elastic member includes a fixed portion connected to the housing and a driving portion connected to the frame and not the housing.

7. The camera module of claim 6, wherein the fixed portion and the driving portion are laterally spaced from each other with respect to the direction of the optical axis.

8. A portable electronic device comprising:
the camera module of claim 1; and
a body part coupled to the camera module.

9. The camera module of claim 1, wherein the frame, the lens barrel, the first case and the second case are bodily distinct each from the other.

10. A camera module comprising:
a lens barrel;
a frame accommodating the lens barrel such that the lens barrel is movable in optical axis direction of the lens barrel;
an elastic member connected to the frame; and
a first case and a second case directly coupled to each other and accommodating the frame therein so that the elastic member presses the frame so as to be aligned in a pressing direction of the elastic member,
wherein the frame is disposed in a fixed position in the optical axis direction.

11. The camera module of claim 10, wherein the frame is pressed toward one of the first and second cases by pressing force of the elastic member.

12. The camera module of claim 11, wherein the elastic member includes a fixed end connected to another one of the first and second cases and a driving end connected to the frame, and the fixed end and the driving end are caused to be positioned on different planes from each other by a coupling of the first and second cases.

13. A camera module comprising:
a frame accommodating a lens barrel;
a housing accommodating the frame; and
an elastic member pressing the frame toward one surface of the housing,
wherein the housing has an opening exposing a portion of the frame to an outside of the housing, and the portion of the frame exposed through the opening is provided with an adjustment part to adjust an alignment state of the frame with respect to the housing when the frame and the housing are fully assembled.

14. The camera module of claim 13, wherein the frame is aligned in the housing in a state in which the frame is elastically supported by the elastic member.

15. The camera module of claim 13, wherein the adjustment part and the opening are disposed in one or more corners of the frame and the housing, respectively.

16. The camera module of claim 13, wherein the adjustment part and the opening are disposed in one or more side surfaces of the frame and the housing, respectively.

17. The camera module of claim 13, wherein one surface of the adjustment part is inclined downwardly in a length or width direction of the frame.

18. The camera module of claim 13, wherein a protrusion part is disposed on one surface of the adjustment part.

19. The camera module of claim 18, wherein an outer surface of the protrusion part is curved.

20. The camera module of claim 13, wherein at least a portion of one surface of the frame is spaced apart from the one surface of the housing by a predetermined interval.

21. The camera module of claim 13, wherein the frame is fixed to the housing in a state in which the frame is inclined with respect to the housing so that an optical axis of a lens provided in the lens barrel is aligned perpendicularly to an image formation surface of an image sensor disposed in the housing.

22. The camera module of claim 13, wherein the frame is fixed to the housing in a state in which the frame has a preset inclination with respect to the housing so that an optical axis of a lens provided in the lens barrel is aligned perpendicularly to an image formation surface of an image sensor disposed in the housing.

23. A camera module, comprising:
a housing comprising a first case and a second case directly coupled to each other to form an internal space;
an elastic member disposed in the housing; and
a frame comprising a lens barrel that is movable in an optical axis direction of the lens barrel, the frame being disposed in the internal space and pressed by the elastic member in an axial direction towards the first case,
wherein the second case receives the frame, and the frame is disposed in a fixed position in the optical axis direction and aligned in the housing in a state in which a lateral gap is formed between a side wall of the frame and a side wall of the housing.

24. The camera module of claim 23, wherein the side wall of the housing has an opening exposing a portion of the side wall of the frame to an outside of the housing.

25. The camera module of claim 24, wherein the frame is fixed to the housing in a state in which the frame is aligned with respect to the housing.

26. The camera module of claim 24, wherein the frame is fixed to the housing in a state in which the frame has a preset inclination with respect to the housing.

27. The camera module of claim 23, wherein the frame is fixed to the housing in a state in which a position of the frame is adjusted so that an optical axis of a lens provided in the lens barrel is aligned perpendicularly to an image formation surface of an image sensor disposed in the housing.

28. A camera module comprising:
a frame accommodating a lens barrel, the lens barrel being configured to accommodate a lens having an optical axis, and the lens barrel being movable in a direction of the optical axis;
a housing comprising a first case and a second case directly coupled to each other, and accommodating the frame, wherein the second case receives the frame;
an elastic member pressing the frame such that an end surface of the frame facing in the direction of the optical axis is pressed toward the second case,
wherein the frame is aligned in the housing by pressing force of the elastic member, and is disposed in a fixed position in the direction of the optical axis.

29. A camera module comprising:
a frame accommodating a lens barrel;
a housing in which the frame is disposed; and
an elastic member pressing the frame toward one surface of the housing,
wherein when the frame and the housing are fully assembled, the elastic member is able to support the frame in a state in which the frame is tilted with respect to the housing so that larger force is applied to a portion of the elastic member than a remaining portion of the elastic member.

30. A method for aligning an optical axis of a camera module having a housing accommodating a frame in which a lens-supporting lens barrel is movably accommodated, the method comprising:

disposing the frame, including the accommodated lens barrel and supported lens, to be movable inside the housing so that the frame is pressed toward one surface of the housing by an elastic member;

measuring a tilted state of an optical axis of the lens;

moving at least a portion of the frame relative to the housing depending on whether the measured tilted state of the optical axis is within a preset range to correct the tilted state of the optical axis; and fixing the frame to the housing.

31. The method of claim 30, wherein in the disposing of the frame inside the housing, the elastic member presses the frame so that one surface of the frame is pressed against the one surface of the housing.

32. The method of claim 30, wherein the measuring of the tilted state of the optical axis of the lens comprises checking whether the optical axis of the lens is perpendicular to an image formation surface of an image sensor disposed in the housing.

33. The method of claim 30, wherein the measuring of the tilted state of the optical axis comprises measuring an angle between the optical axis and a line orthogonal to an image formation surface of an image sensor disposed in the housing.

34. The method of claim 30, wherein the measuring of the tilted state of the optical axis comprises measuring an angle between a plane parallel to an image formation surface of an image sensor disposed in the housing and one surface of the frame.

35. The method of claim 30, wherein when the tilted state of the optical axis is within the preset range, the frame is fixed to the housing in a state in which one surface of the frame and the one surface of the housing are pressed against each other.

36. The method of claim 30, wherein when the tilted state of the optical axis is out of the preset range, the frame is fixed to the housing after the tilted state of the optical axis is corrected to be within the preset range by moving the portion of the frame.

37. The method of claim 30, wherein to correct the tilted state of the optical axis, the portion of the frame is moved in a state in which a remaining portion of the frame is fixed.

38. A method for aligning an optical axis of a camera module having a housing accommodating a frame in which a lens-supporting lens barrel is movably accommodated, the method comprising:

disposing the frame, including the accommodated lens barrel and supported lens, to be movable inside the housing so that the frame is pressed toward one surface of the housing by an elastic member;

measuring a tilted state of an optical axis of the lens; and fixing the frame to the housing after moving at least a portion of the frame relative to the housing depending on the measured tilted state of the optical axis to correct the tilted state of the optical axis of the lens.

39. A camera module, comprising:

a housing comprising a first case and a second case directly coupled to each other;

a frame disposed in the housing and received by the second case;

a lens barrel supported by the frame such that the lens barrel is movable in an optical axis direction of the lens barrel; and an elastic member disposed between the frame and one surface of the housing and configured to press the frame against another surface of the housing through elastic force, wherein the frame is disposed in a fixed position in the optical axis direction.

40. The camera module of claim 39, wherein at least one side surface of the frame is disposed to be spaced apart from at least one side inner surface of the housing.

41. The camera module of claim 39, wherein the housing comprising one or more openings exposing the frame to an outside of the housing.

42. The camera module of claim 39, wherein:

one or more protrusion parts are formed on a surface of the frame; and one or more support parts are formed on the another surface of the housing corresponding to the protrusion parts.

* * * * *